United States Patent
Li et al.

(10) Patent No.: US 8,946,605 B2
(45) Date of Patent: Feb. 3, 2015

(54) MICROWAVE HEATING DEVICE AND ITS APPLICATION IN CHEMICAL REACTIONS

(75) Inventors: Yunlong Li, Beijing (CN); Yanlin Zhao, Wenzhou (CN); Yangchuan Tong, Beijing (CN); Guoxing Chen, Wenzhou (CN)

(73) Assignees: Zhejiang Twrd New Material Co., Ltd., Lishui, Zhejiang (CN); Beijing Sijiantong Technology & Development Co., Ltd., Beijing (CN)

( * ) Notice: Subject to any disclaimer, the term of this patent is extended or adjusted under 35 U.S.C. 154(b) by 765 days.

(21) Appl. No.: 12/808,355

(22) PCT Filed: Dec. 2, 2008

(86) PCT No.: PCT/CN2008/073289
§ 371 (c)(1),
(2), (4) Date: Mar. 21, 2011

(87) PCT Pub. No.: WO2010/063144
PCT Pub. Date: Jun. 10, 2010

(65) Prior Publication Data
US 2011/0253707 A1    Oct. 20, 2011

(51) Int. Cl.
H05B 6/70    (2006.01)
H05B 6/80    (2006.01)
B01J 19/12   (2006.01)

(52) U.S. Cl.
CPC ........... B01J 19/126 (2013.01); H05B 6/806 (2013.01); *B01J 2219/0004* (2013.01); *B01J 2219/0871* (2013.01); *B01J 2219/1227* (2013.01)
USPC .......................................... 219/690; 219/687

(58) Field of Classification Search
CPC ............. B01J 19/126; B01J 2219/0004; B01J 2219/1227; B01J 2219/0871; H05B 6/806
USPC .......... 219/690, 687, 745, 688, 762; 315/112, 315/248; 372/82, 56; 99/451–453
See application file for complete search history.

(56) References Cited

U.S. PATENT DOCUMENTS 4,125,389 A    11/1978  King
5,035,867 A    7/1991   Dang Vu et al.
(Continued)

FOREIGN PATENT DOCUMENTS

AU    2003292086 B2    5/2009
CN    1109576 A    10/1995
(Continued)

OTHER PUBLICATIONS

PCT International Search Report for PCT Counterpart Application No. PCT/CN2008/073289 containing Communication relating to the Results of the Partial International Search Report, 8 pgs., (Sep. 17, 2009).

(Continued)

*Primary Examiner* — Quang Van
(74) *Attorney, Agent, or Firm* — Blakely, Sokoloff, Taylor & Zafman LLP

(57) ABSTRACT

Disclosed herein is a microwave heating device. A material conduit runs into and out of a microwave irradiation cavity through a cavity wall of the microwave irradiation cavity. A waveguide tube for guiding microwave is installed on the cavity wall. A heat exchange tube is disposed inside the material conduit and enters and leaves the material conduit from the nozzle or wall of the material conduit. The microwave heating device is used in chemical reactions. The microwave heating device may control the temperature of the material inside the material conduit under continuous irradiation of microwave.

17 Claims, 4 Drawing Sheets

(56) References Cited

U.S. PATENT DOCUMENTS

| | | | |
|---|---|---|---|
| 5,235,251 A * | 8/1993 | Schlie | 315/112 |
| 8,263,917 B2 * | 9/2012 | Matsuzawa et al. | 219/687 |
| 2006/0039838 A1 | 2/2006 | Barnhardt et al. | |

FOREIGN PATENT DOCUMENTS

| | | | |
|---|---|---|---|
| CN | 1231213 A | | 10/1999 |
| CN | 2821468 Y | | 9/2006 |
| CN | 1973992 A | | 6/2007 |
| CN | 101294942 A | | 10/2008 |
| CN | 101400195 A | | 4/2009 |
| DE | 3428514 A1 | | 3/1986 |
| JP | 2005-322582 | | 11/2005 |
| JP | 2006-130385 | | 5/2006 |

OTHER PUBLICATIONS

Examiner's Report No. 2 for Counterpart Australian Patent Application No. 2008364687 (Report Date: Jun. 9, 2011).

* cited by examiner

MICROWAVE HEATING DEVICE AND ITS APPLICATION IN CHEMICAL REACTIONS

CROSS-REFERENCE TO RELATED APPLICATION

This patent application is a U.S. National Phase application under 35 U.S.C. §371 of International Application No. PCT/CN2008/073289, filed on Dec. 2, 2008, entitled MICROWAVE HEATER AND ITS APPLICATION IN CHEMICAL REACTION.

FIELD OF THE INVENTION

The present invention relates to a heating device and particularly to a microwave heating device and its application in chemical reactions.

BACKGROUND OF THE INVENTION

Microwave is the electromagnetic wave of which wavelength is between the wavelength of infrared light wave and the wavelength of radio wave, i.e.: within the range of 1 mm-100 cm.

In a microwave field, the molecules of the medium generate dipole orientation polarization and interfacial polarization. As the alternating electric field generated by microwave changes direction hundreds of million times per second and dipole orientation polarization is unable to keep pace with the fast changing alternating electric field and lags behind it, intermolecular friction and heat energy are generated. The energy is transferred in form of electromagnetic wave to realize agitation at molecular level and fast and uniform heating, so microwave heating is also known as "voluminal heating" without a temperature gradient.

Compared with conventional heating methods, microwave heating has the following advantages: 1. Voluminal heating. Under the action of microwave, heat may be generated in different depths of the acted medium simultaneously, so that the heating of the medium is uniform without a temperature gradient so as to realize steady chemical reactions of the heated medium. 2. Selective heating of medium. For metal (conductor) medium, microwave may be completely reflected, so it is not easy to heat; for the medium with low electric conductivity and small polarization loss, microwave is almost completely transmitted through it, so it can not be heated; for the medium which is prone to polarization in a microwave field, it can easily absorb microwave and thus can be quickly heated. 3. High thermal efficiency and no pollution. Microwave can convert electromagnetic energy into heat energy without generating pollution or energy loss.

In addition, microwave also has a special "non-heating effect" resulting from its direct action upon the reacting molecules. As proved by tests, microwave has such special effects as: changing the course of chemical reactions, lowering reaction activation energy, increasing synthesis velocity, raising equilibrium conversion, reducing byproducts and changing stereoselectivity of the products. Just because of the special promotion effect of microwave on chemical reactions, the application of microwave in chemical reactions not only has the great significance of theoretical study but also has huge potential in industrial application.

Due to the above features of microwave, microwave has been extensively researched and applied as an efficient and clean heating means and chemical reaction means in recent years. However, since the penetration distance of microwave is short and the temperature of the heated medium is uncontrollable under the continuous irradiation of microwave, large-scale industrialization can't be realized by using the microwave devices currently applied in chemical reactions and microwave heating for chemical reactions only stay in the stage of laboratory study.

CN2821468Y discloses a microwave treater at least comprising a box-shape cavity which is provided with conduit joints in the middle locations of its two opposite sides. Among the other two opposite sides of the box-shape cavity, one is closed and the other side is a flange joint. This flange joint is connected to a microwave generator. The conduit through which the fluid to be heated passes is disposed inside the box-shape cavity, and the two ends of the conduit extend out from the conduit joints. A plurality of such treaters ($\leq 15$) may be connected to form a long reactor. Meanwhile, a plurality of conduits may be arranged in parallel inside the cavity. This device is designed considering the problem of short penetration distance of microwave, but it still fails to solve the problem of uncontrollable medium temperature under the continuous irradiation of microwave, so it can be used to heat fluid only, but can't be applied in the chemical reactions in which temperature needs to be controlled under the continuous irradiation of microwave.

CN1231213A discloses an industrial microwave oven exclusively for fluid treatment which comprises a microwave resonant cavity provided with a microwave input port, a fluid inlet, a fluid outlet and an operation gate, and the shields disposed at the fluid inlet and outlet, respectively. Inside the resonant cavity, a fluid circulator exclusively for making the fluid subject to full physical and chemical reactions in the microwave field is disposed. In the upper part and lower part of the resonant cavity, the devices enabling the continuous supply and discharge of fluid as per process requirements are connected to the fluid inlet and outlet. Although the microwave oven guarantees the continuous supply and continuous discharge of material, it can heat the fluid only and can't be applied in the chemical reactions in which temperature needs to be controlled under continuous irradiation of microwave.

The design in the above patent literatures realizes the industrialized application of microwave as a heating means, and solves the problem of poor penetrating ability of microwave, but these devices still fail to solve the problem that the temperature of medium increases continuously and rapidly and can't be controlled under the continuous irradiation of microwave, so they can't be applied in the chemical reaction processes in which temperature needs to be controlled under the continuous irradiation of microwave.

SUMMARY OF THE INVENTION

The purpose of the present invention is to overcome the defect of the microwave heating devices in prior art: the temperature of material can't be controlled under the continuous irradiation of microwave, and provide a microwave heating device which may control the temperature of material under the continuous irradiation of microwave.

The present invention provides a microwave heating device which comprises a microwave irradiation cavity and a material conduit which runs into and out of the microwave irradiation cavity through cavity wall of the microwave irradiation cavity, a waveguide tube for guiding microwave being installed on the cavity wall, characterized in that the microwave heating device further comprises a heat exchange tube which is disposed inside the material conduit and enters and leaves the material conduit from the nozzle or wall of the material conduit.

As a heat exchange tube is disposed inside the material conduit, when the microwave heating device according to the present invention is used to heat the material inside the material conduit, cold medium can be introduced into the heat exchange tube to take away surplus heat in time, so as to control the temperature of the material inside the material conduit under the continuous irradiation of microwave. Therefore, the microwave device according to the present invention may be applied in the chemical reactions that need temperature control, and may control the heating temperature of material with an accuracy of $\pm(1\text{-}5)^\circ$ C.

DETAILED DESCRIPTION OF THE EMBODIMENTS

Figure 1:
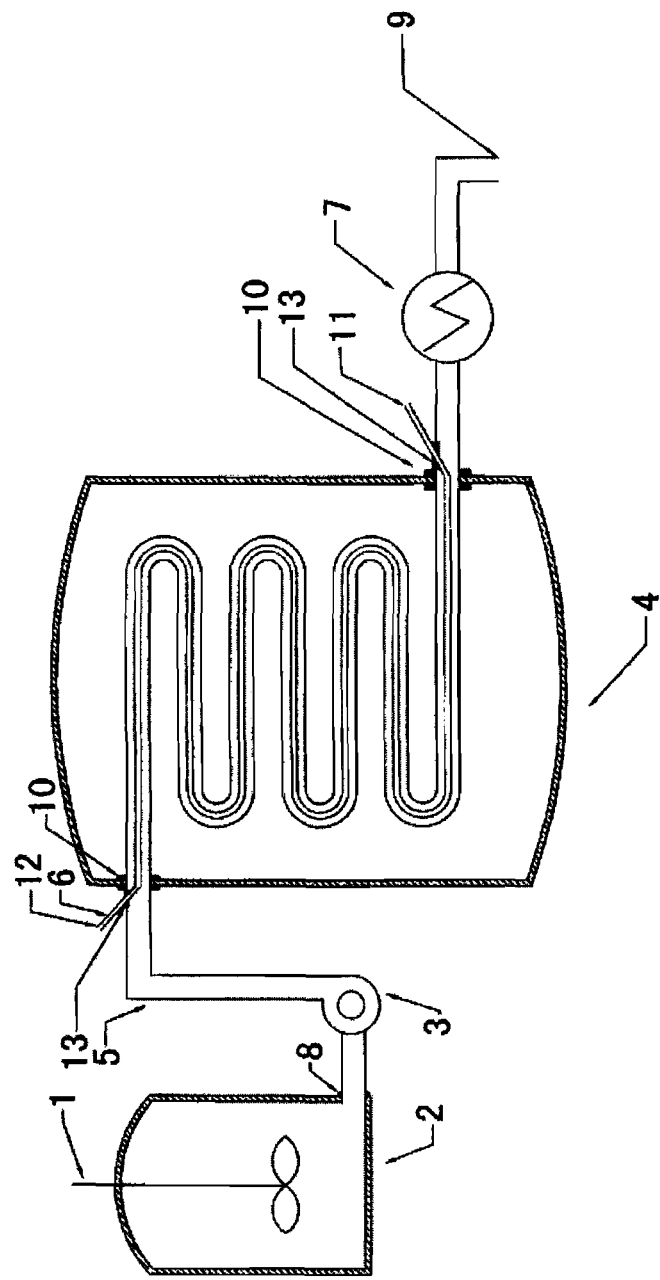
FIG. 1 shows the longitudinal section of the microwave heating device of Example 1.
Figure 2:
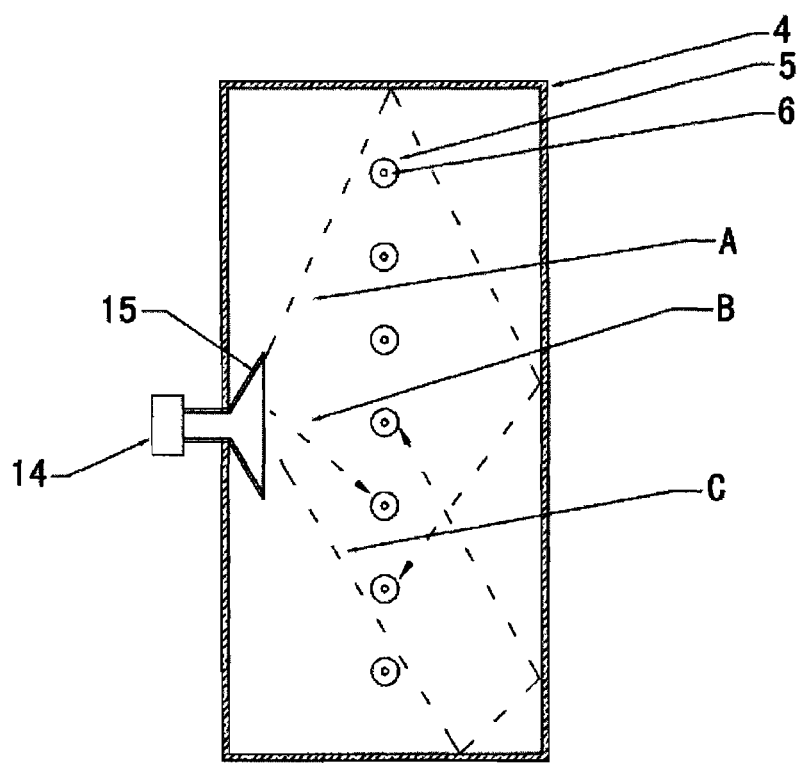
FIG. 2 shows the longitudinal section in a direction perpendicular to that of FIG. 1.

In reference to FIG. 1 and FIG. 2, the microwave heating device according to the present invention comprises a microwave irradiation cavity 4 and a material conduit 5. The material conduit 5 runs into and out of the microwave irradiation cavity 4 through the cavity wall. On the cavity wall of the microwave irradiation cavity 4, a waveguide tube 15 is installed to guide microwave. One end of the waveguide tube 15 is inside the microwave irradiation cavity 4 and the other end is outside the microwave irradiation cavity 4, such that the waveguide tube sends the microwave generated by a microwave emission source 14 outside the microwave irradiation cavity 4 into the microwave irradiation cavity 4. The microwave heating device further includes a heat exchange tube 6. The heat exchange tube 6 is disposed inside the material conduit 5 and enters and leaves the material conduit 5 from the nozzle or wall of the material conduit 5.

According to a preferred embodiment of the microwave heating device provided by the present invention, as shown in FIG. 1, the heat exchange tube 6 enters from the nozzle or wall of each material conduit 5 at one end of the material conduit and leaves it from the nozzle or wall at the other end of the material conduit.

Figure 3:
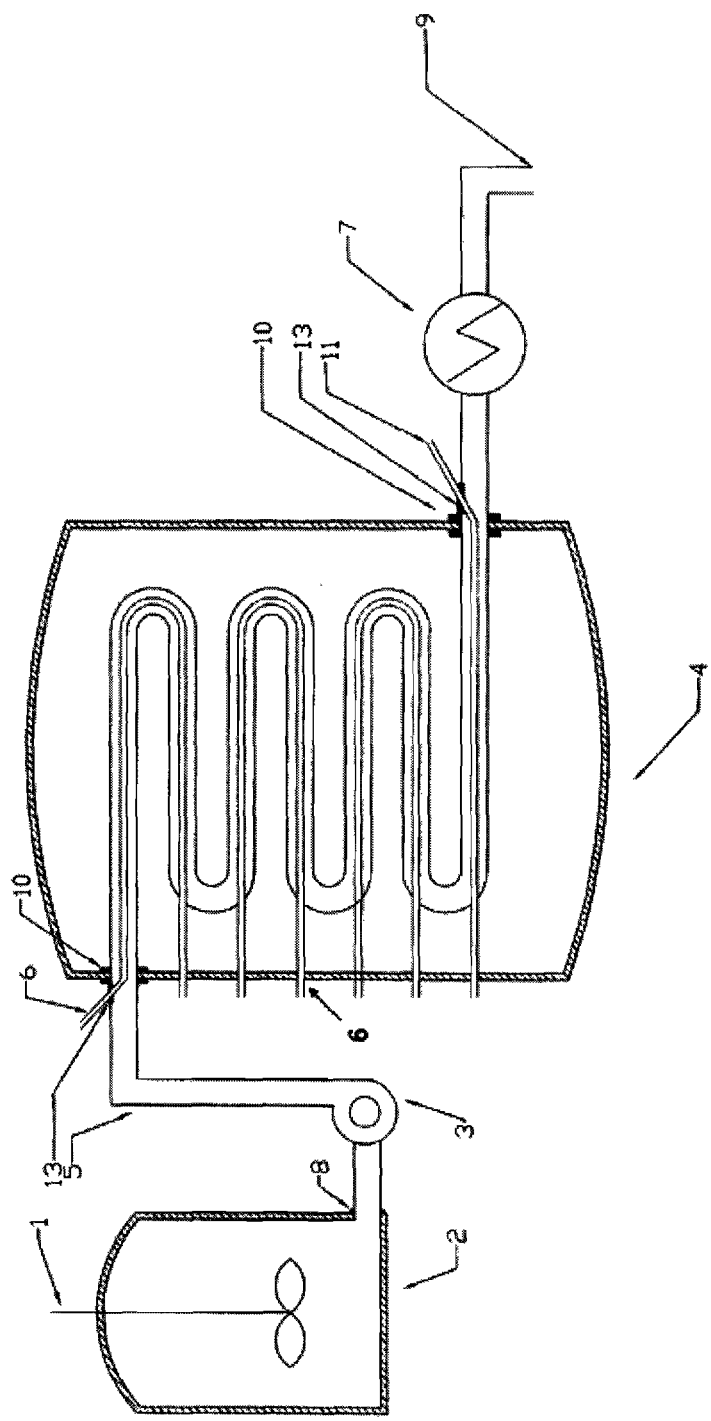
FIG. 3 shows the longitudinal section of the microwave heating device according to another embodiment of the present invention.

According to another preferred embodiment of the microwave heating device provided by the present invention, as shown in FIG. 3, each material conduit 5 may be divided into a plurality of segments. A heat exchange tube 6 enters and leaves each segment of the material conduit 5. For example, a material conduit 5 may be divided into 2-5 segments or more. The segments of the material conduit 5 are connected by joints. In each segment, one heat exchange tube 6 is disposed, enters this segment of material conduit 5 from one end and leaves it from the other end. In this way, as the heat exchange tube 6 is shorter, it may have better heat exchange effect on material.

In the microwave heating device provided by the present invention, there may be a plurality of independent material conduits. A heat exchange tube runs into and out of each material conduit. These independent material conduits may be arranged in parallel inside the microwave irradiation cavity. When the amount of the material to be treated is large, the material may be separately filled into the material conduits.

Figure 4:
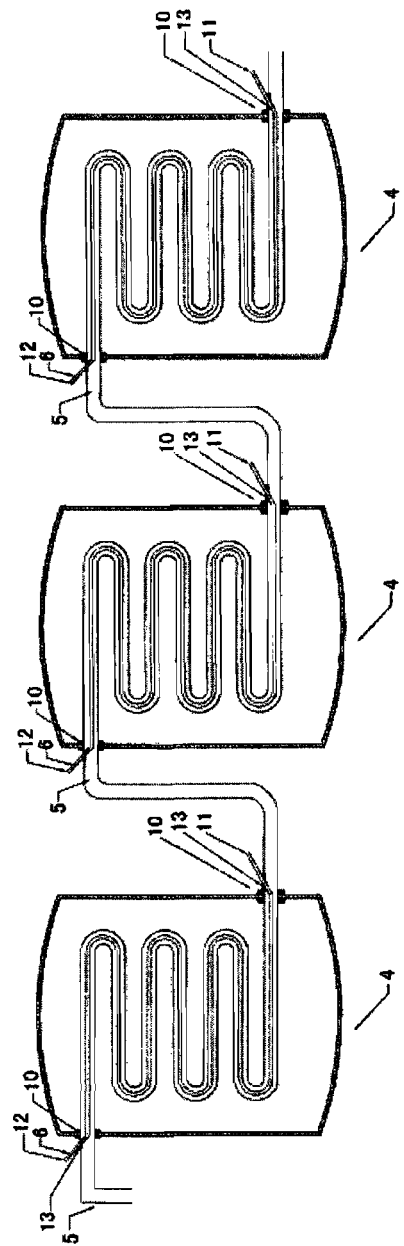
FIG. 4 shows the longitudinal section of the microwave heating device according to still another embodiment of the present invention.

According to the microwave heating device provided by the present invention, preferably, when the adopted material conduit is long, the reaction time of the material will be long. In order that the heating temperature of the material meets the above condition, there may be a plurality of the microwave irradiation cavities, for example 2-10 microwave irradiation cavities. The material conduit passes through these microwave irradiation cavities sequentially. As shown in FIG. 4, three microwave irradiation cavities are adopted and the material conduit 5 passes through them sequentially.

According to the microwave heating device provided by the present invention, as well known to those skilled in the art, the microwave irradiation cavity is made from a material that reflects microwave or the inner wall of the microwave irradiation cavity is plated with a layer of the material that reflects microwave. The material that reflects microwave may be metal material, such as stainless steel, aluminum, aluminum alloy, iron, copper or silver.

According to the microwave heating device provided by the present invention, the material conduit 5 may be in any shape, preferably S-shaped, spiral or straight, and its section is preferably round or oval. For example, FIG. 1 shows the embodiment in which only one material conduit 5 in S shape is used. The heat exchange tube 6 may be in any shape, preferably S-shaped, spiral or straight, and its section is preferably round or oval. The number of the heat exchange tubes 6 may be one or more than one. FIG. 1 shows the embodiment in which only one heat exchange tube 6 in S shape is used.

According to the microwave heating device provided by the present invention, the section of the material conduit 5 may be in various shapes, for example round or oval. The preferred inner diameter of the round section is 50-200 mm. The preferred length of the long axis of the oval section is 50-1000 mm and the preferred length of the short axis is 50-200 mm. The section of the heat exchange tube 6 may be in various shapes, for example round or oval. The preferred inner diameter of the round section is 3-25 mm. The preferred length of the long axis of the oval section is 3-125 mm and the preferred length of the short axis is 3-25 mm.

According to an embodiment of the microwave heating device provided by the present invention, the material conduit 5 is made from a material that completely transmits microwave. This material is well known to those skilled in the art, for example: polyimide, modified polyimide, polyether-ether-ketone, modified polyether-ether-ketone, polytetrafluoroethylene (PTFE), modified polytetrafluoroethylene, polyethylene (PE), modified polyethylene, polypropylene (PP), modified polypropylene, polystyrene (PS), modified polystyrene, quartz or glass. The more preferred material is PTFE and modified PTFE, and/or PS and modified PS.

According to an embodiment of the microwave heating device provided by the present invention, the heat exchange tube 6 is preferably made from a material with good thermal conductivity. The material may be any material that reflects microwave or completely transmits microwave. The material that reflects microwave is well known to those skilled in the art, for example: metal material such as stainless steel, aluminum, aluminum alloy, iron, copper or silver. The more preferred is stainless steel and aluminum alloy. The material that completely transmits microwave is well known to those skilled in the art, for example: glass or porcelain.

According to an embodiment of the microwave heating device provided by the present invention, the medium inside the heat exchange tube may be any cold medium well known to those skilled in the art, for example: one or more of compressed air, kerosene, hexane, benzene, glycerol and water. The cold medium should be selected in light of the properties of the material of the heat exchange tube. For example, if the material of the heat exchange tube is a material that completely transmits microwave, the cold medium should be a medium that doesn't absorb microwave, such as: kerosene, hexane, benzene and other nonpolar hydrocarbon liquids; if the material of the heat exchange tube is a material that reflects microwave, any cold medium that may effectively exchange heat may be used.

According to an embodiment of the microwave heating device provided by the present invention, there may be a plurality of waveguide tubes 15, which are evenly distributed on the cavity wall of the microwave irradiation cavity 4. The waveguide tubes may be mounted on one or more of the cavity walls of the microwave irradiation cavity. When the microwave heating device includes a plurality of microwave irradiation cavities 4, the number of the waveguide tubes 15 on each of the microwave irradiation cavity 4 may be same or different.

The present invention also provides use of the above microwave heating device in chemical reactions. The microwave heating device may be applied in various types of chemical reactions, for example: F-T synthesis, NaY synthesis and the synthetic reaction of hydrotalcite. Depending on the time required for the chemical reaction, the reactants may pass the reaction tube in one time or in several times circularly to ensure sufficient reaction of the reactants in the reaction tube.

When the microwave heating device provided by the present invention is applied, the microwave may be applied in a frequency well known to those skilled in the art, for example: 915 MHz or 2450 MHz.

Hereinafter the present invention will be described in details by referring to examples, but the present invention is not limited thereto.

Example 1

As shown in FIG. 1 and FIG. 2, a form of the microwave heating device is provided by the present invention.

The microwave heating device comprises a microwave irradiation cavity 4, a material conduit 5, a heat exchange tube 6, a microwave emission source 14 and a waveguide tube 15. The microwave irradiation cavity 4 is made from stainless steel and its dimensions are 10 m×15 m×0.3 m. One material conduit joint is provided in the upper part and lower part of the microwave irradiation cavity 4, respectively, so that the material conduit 5 runs in and runs out.

The material conduit joints and the material conduit 5 are sealed with sealing rings 10. The material conduit 5 is made from PTFE and its inner diameter is 80 mm. The material conduit 5 is arranged in S shape inside the microwave irradiation cavity 4 and its total length is 80 m. The heat exchange tube 6 is inside the material conduit 5 and enters and goes out from the material conduit 5 via the holes at the parts of the material conduit 5 outside the microwave irradiation cavity 4. The holes and the heat exchange tube 6 are sealed with the sealing rings 13. The heat exchange tube 6 is made from stainless steel and its inner diameter is 8 mm.

The microwave emission source 14 is located outside the microwave irradiation cavity 4. The microwave emitted by the microwave emission source 14 is sent into the microwave irradiation cavity 4 via a waveguide tube 15 mounted on the inner wall of the microwave irradiation cavity 4. The end of the waveguide tube 15 towards the cavity is spread outwardly so that the microwave is irradiated in any direction inside the cavity. Part of the microwave B directly irradiates the side of the material conduit 5 that faces the waveguide tube 15, and part of the microwave A and C irradiates cavity wall and is reflected to the other side of the material conduit 5 to make the material conduit 5 obtain sufficient microwave irradiation.

Example 2

This example describes the application of the microwave heating device of Example 1 in the production of NaY molecular sieve.

1. Preparation of Orienting Agent 19.91 Kg of soluble silicate ($SiO_2$: 26 wt %, $Na_2O$: 8.2 wt %) and 5.12 Kg of water are weighed at a molar ratio of $Na_2O:Al_2O_3:SiO_2:H_2O$ being 16:1:15:320, 19.61 Kg of highly basic sodium aluminate ($Al_2O_3$: 3 wt %, $Na_2O$: 21 wt %) was added thereto under stirring, stirring lasted 1 h and then the resulting materials are aged at 30° C. for 24 h by standing.

2. Preparation of NaY Molecular Sieve

As shown in FIG. 1 and FIG. 2, 20.58 Kg of NaOH, 89.01 Kg of water, 44.65 Kg of the orienting agent and 112.39 Kg of soluble silicate ($SiO_2$: 26 wt %, $Na_2O$: 8.2 wt %) were added into feed tank 2, stirring paddle 1 was turned on, 234.37 Kg of aluminum sulfate solution (a water solution formed by dissolving 34.37 Kg of $Al_2(SO_4)_3 \cdot 18H_2O$ into 200 Kg of water) was added into the above mixed solution under strong stirring, and stirred for 1 h.

The above solution was pumped into the microwave heating device described in Example 1 by feed pump 3 at a speed of 5 m/min. The microwave source 14 (microwave frequency of 2450 MHz) was turned on. 5 min later, the heat exchange system is turned on. The heat exchange medium in the heat exchange system was water. It flowed in from nozzle 11 and out from nozzle 12 at a speed of 1 m/min at the beginning. Its speed was evenly increased to 15 m/min after 12 min. Material entered the microwave reactor from inlet 8 and then was discharged from outlet 9. The material discharged from the outlet 9 again entered the microwave reactor from the inlet 8 through circulation. The flow rate of the heat exchange medium was finely adjusted to 17 m/min so that the temperature of the material in the microwave reaction tube was stably controlled at 98-101° C. After the stable reaction temperature was reached, the reaction was performed for 1.5 h, and then microwave heating was stopped. After the temperature of the reaction product was lowered to below 50° C. through heat exchange by heat exchanger 7, it was discharged from the outlet 9.

After the discharged material was washed and dried, raw NaY powder is obtained. Its crystallinity determined with an X-ray diffractometer (Shimadzu XRD7000) was 62%.

Example 3

The constituents of the microwave heating device in this embodiment are basically the same as those in Example 1, except that the dimensions of the microwave irradiation cavity is 10 m×15 m×0.6 m, the inner diameter of the material conduit 5 is 200 mm and the inner diameter of the heat exchange tube 6 is 25 mm.

Example 4

This example describes the application of the microwave heating device of example 3 to the synthesis of NaY molecular sieve.

1. Preparation of Orienting Agent 124.47 Kg of soluble silicate ($SiO_2$: 26 wt %, $Na_2O$: 8.2 wt %) and 32 Kg of water were weighed at a molar ratio of 16 $Na_2O$:$Al_2O_3$:15 $SiO_2$:320 $H_2O$, 122.63 Kg of highly basic sodium aluminate ($Al_2O_3$: 3 wt %, $Na_2O$: 21 wt %) was added thereto under stirring, stirring lasted 1 h and then the resulting materials are aged at 30° C. for 24 h by standing.

2. Preparation of NaY Molecular Sieve 128.68 Kg of NaOH, 506.92 Kg of water, 279.12 Kg of the oriented agent and 702.69 Kg of soluble silicate ($SiO_2$: 26 wt %, $Na_2O$: 8.2 wt %) were added into feed tank 2, stirring paddle 1 was turned on, 1514.86 Kg of aluminum sulfate solution (a water solution formed by dissolving 214.86 Kg of $Al_2(SO_4)_3.18H_2O$ into 1300 Kg of water) was added into the above mixed solution under strong stirring, and stirred for 1 h.

The above solution is pumped into the microwave heating device described in Example 3 by feed pump 3 at a speed of 5 m/min. The microwave source 14 (microwave frequency of 2450 MHz) was turned on. 10 min later, the heat exchange system was turned on. The heat exchange medium in the heat exchange system was water. It flowed in from nozzle 11 and out from nozzle 12 at a speed of 1 m/min at the beginning. Its speed was evenly increased to 17 m/min after 5 min. Material entered the microwave reactor from inlet 8 and then was discharged from outlet 9. The material discharged from the outlet 9 again entered again the microwave reactor from the inlet 8 through circulation 16 min later. The flow rate of the heat exchange medium was finely adjusted to 18.2 m/min so that the temperature of the material in the microwave reaction tube was stably controlled at 98-101° C. After the stable reaction temperature was reached, the reaction was performed for 1.5 h, and then microwave heating was stopped. After the temperature of the reaction product was lowered to below 50° C. through heat exchange by heat exchanger 7, it was discharged from the outlet 9.

After the discharged material was washed and dried, raw NaY powder was obtained. Its crystallinity determined with an X-ray diffractometer (Shimadzu XRD7000) was 16%.

Example 5

The constituents of the microwave heating device in this embodiment are basically the same as those in Example 1, except that the dimensions of the microwave irradiation cavity is 10 m×15 m×0.2 m, the inner diameter of the material conduit 5 is 50 mm and the inner diameter of the heat exchange tube 6 is 3 mm.

Example 6

This example describes the application of the microwave heating device in Example 5 to the synthesis of NaY molecular sieve.

1. Preparation of Orienting Agent 7.78 Kg of soluble silicate ($SiO_2$: 26 wt %, $Na_2O$: 8.2 wt %) and 2 Kg of water were weighed at a molar ratio of 16 $Na_2O$:$Al_2O_3$:15 $SiO_2$:320 $H_2O$, 7.67 Kg of highly basic sodium aluminate ($Al_2O_3$: 3 wt %, $Na_2O$: 21 wt %) was added thereto under stirring, stirring lasted 1 h and then the resulting materials are aged at 30° C. for 24 h by standing.

2. Preparation of NaY Molecular Sieve

8 Kg of NaOH, 32.7 Kg of water, 17.4 Kg of the oriented agent and 43.8 Kg of soluble silicate ($SiO_2$: 26 wt %, $Na_2O$: 8.2 wt %) were added into feed tank 2, stirring paddle 1 was turned on, 93.4 Kg of aluminum sulfate solution (a water solution formed by dissolving 13.4 Kg of $Al_2(SO_4)_3.18H_2O$ into 80 Kg of water) was added into the above mixed solution under strong stirring, and stirred for 1 h.

The above solution is pumped into the microwave heating device described in Example 5 by feed pump 3 at a speed of 5 m/min. The microwave source 14 (microwave frequency of 2450 MHz) was turned on. 3 min later, the heat exchange system was turned on. The heat exchange medium in the heat exchange system was water. It flowed in from nozzle 11 and out from nozzle 12 at a speed of 1 m/min at the beginning. Its speed was evenly increased to 15 m/min after 5 min Material entered the microwave reactor from inlet 8 and then was discharged from outlet 9. The material discharged from the outlet 9 again entered again the microwave reactor from the inlet 8 through circulation. The flow rate of the heat exchange medium was finely adjusted to 15.6 m/min so that the temperature of the material in the microwave reaction tube was stably controlled at 98-101° C. After the stable reaction temperature was reached, the reaction was performed for 1.5 h, and then microwave heating was stopped. After the temperature of the reaction product was lowered to below 50° C. through heat exchange by heat exchanger 7, it was discharged from the outlet 9.

After the discharged material was washed and dried, raw NaY powder was obtained. Its crystallinity determined with an X-ray diffractometer (Shimadzu XRD7000) was 80%.

What is claimed is:

1. A microwave heating device comprising a microwave irradiation cavity and a material conduit which runs into and out of the microwave irradiation cavity through cavity wall of the microwave irradiation cavity, a waveguide tube for guiding microwave being installed on the cavity wall, characterized in that the microwave heating device further comprises a heat exchange tube which is disposed inside the material conduit and enters and leaves the material conduit from the nozzle or wall of the material conduit.

2. The device according to claim 1, wherein the heat exchange tube enters the material conduit from the nozzle or wall at one end of the material conduit and leaves the material conduit from the nozzle or wall at the other end of the material conduit.

3. The device according to claim 2, wherein the material conduit is divided into a plurality of segments or the device comprises a plurality of independent material conduits, and a heat exchange tube enters and leaves each material conduit.

4. The device according to claim 2, wherein the material conduit and heat exchange tube are each S-shaped, spiral or straight.

5. The device according to claim 2, wherein the section of the material conduit is round or oval, the inner diameter of the round section being 50-200 mm, the oval section having a long axis of 50-1000 mm and a short axis of 50-200 mm; and the section of the heat exchange tube is round or oval, the inner diameter of the round section being 3-25 mm, the oval section having a long axis of 3-125 mm and a short axis of 3-25 mm.

6. The device according to claim 5, wherein the material conduit is made from a material that completely transmits microwave, and the heat exchange tube is made from a material that reflects microwave or completely transmits microwave.

7. The device according to claim 6, wherein the material conduit is made from polyimide, modified polyimide, polyether-ether-ketone, modified polyether-ether-ketone, polytetrafluoroethylene, modified polytetrafluoroethylene, polyethylene, modified polyethylene, polypropylene, modified polypropylene, polystyrene, modified polystyrene, quartz or glass; and the heat exchange tube is made from stainless steel, aluminum, aluminum alloy, iron, copper, silver, glass or porcelain.

8. The device according to claim 2, wherein the microwave irradiation cavity is made from a material that reflects microwave, or the inner wall of the microwave irradiation cavity is plated with a layer of the material that reflects microwave.

9. The device according to claim 1, wherein the material conduit is divided into a plurality of segments or the device comprises a plurality of independent material conduits, and a heat exchange tube enters and leaves each material conduit.

10. The device according to claim 1, wherein the material conduit and heat exchange tube are each S-shaped, spiral or straight.

11. The device according to claim 1, wherein the section of the material conduit is round or oval, the inner diameter of the round section being 50-200 mm, the oval section having a long axis of 50-1000 mm and a short axis of 50-200 mm; and the section of the heat exchange tube is round or oval, the inner diameter of the round section being 3-25 mm, the oval section having a long axis of 3-125 mm and a short axis of 3-25 mm.

12. The device according to claim 11, wherein the material conduit is made from a material that completely transmits microwave, and the heat exchange tube is made from a material that reflects microwave or completely transmits microwave.

13. The device according to claim 12, wherein the material conduit is made from polyimide, modified polyimide, polyether-ether-ketone, modified polyether-ether-ketone, polytetrafluoroethylene, modified polytetrafluoroethylene, polyethylene, modified polyethylene, polypropylene, modified polypropylene, polystyrene, modified polystyrene, quartz or glass; and the heat exchange tube is made from stainless steel, aluminum, aluminum alloy, iron, copper, silver, glass or porcelain.

14. The device according to claim 1, wherein the device comprises a plurality of the microwave irradiation cavities, through which the material conduit passes sequentially.

15. The device according to claim 1, wherein the device comprises a plurality of the waveguide tubes, which are evenly distributed on the cavity wall of the microwave irradiation cavity.

16. The device according to claim 1, wherein the microwave irradiation cavity is made from a material that reflects microwave, or the inner wall of the microwave irradiation cavity is plated with a layer of the material that reflects microwave.

17. A method comprising:
using a microwave heating device in chemical reactions, wherein the microwave heating device comprises a microwave irradiation cavity and a material conduit which runs into and out of the microwave irradiation cavity through cavity wall of the microwave irradiation cavity, a waveguide tube for guiding microwave being installed on the cavity wall, characterized in that the microwave heating device further comprises a heat exchange tube which is disposed inside the material conduit and enters and leaves the material conduit from the nozzle or wall of the material conduit.

* * * * *